United States Patent [19]

Kashida et al.

[11] Patent Number: 5,400,148
[45] Date of Patent: Mar. 21, 1995

[54] VIDEO SIGNAL PROCESSING APPARATUS HAVING SERIES CONNECTED TIMING CONTROL CIRCUITS

[75] Inventors: Motokazu Kashida, Musashino; Shinichi Yamashita, Yokohama, both of Japan

[73] Assignee: Canon Kabushiki Kaisha, Tokyo, Japan

[21] Appl. No.: 273,629

[22] Filed: Jul. 12, 1994

Related U.S. Application Data

[63] Continuation of Ser. No. 213,814, Mar. 14, 1994, abandoned, which is a continuation of Ser. No. 688,275, Apr. 22, 1991, abandoned.

[30] Foreign Application Priority Data

Apr. 25, 1990 [JP] Japan .................. 2-109299

[51] Int. Cl.6 .................. H04N 5/76; H04N 9/79
[52] U.S. Cl. .................. 358/324; 358/325; 358/323; 358/337; 358/339; 348/500; 348/512; 360/37.1
[58] Field of Search .............. 358/324, 325, 323, 319, 358/310, 335, 337, 339; 348/441, 500, 512; 360/26, 33.1, 37.1; H04N 5/76, 9/79

[56] References Cited

U.S. PATENT DOCUMENTS

| | | | |
|---|---|---|---|
| 4,679,084 | 7/1987 | Topper et al. | 358/160 |
| 4,803,553 | 2/1989 | Schrock et al. | 358/149 |
| 5,012,352 | 4/1991 | Yoshimura et al. | 358/343 |

Primary Examiner—Tommy P. Chin
Assistant Examiner—Khoi Truong
Attorney, Agent, or Firm—Fitzpatrick, Cella, Harper & Scinto

[57] ABSTRACT

A video signal processing apparatus for processing a video signal includes a plurality of series-connected signal processing circuits. A plurality of timing control circuits for respectively controlling the plurality of signal processing circuits in accordance with a reference signal are provided. At least one of the plurality of timing control circuits inputs a timing signal conforming to the reference signal, and delays the passage of the timing signal therethrough by a time interval corresponding to a delay time of the video signal generated by the corresponding signal processing circuit and outputs a delayed timing signal. Consequently, it is possible to minimize a change in the timing control circuits, that is, a change in the overall apparatus, caused by the partial change in the design of the signal processing circuits.

24 Claims, 4 Drawing Sheets

| FIG. 1A |
|---------|
| FIG. 1B |

FIG. 2

| FIG. 2A |
|---------|
| FIG. 2B |

FIG. 2B

VIDEO SIGNAL PROCESSING APPARATUS HAVING SERIES CONNECTED TIMING CONTROL CIRCUITS

This application is a continuation of application Ser. No. 08/213,814, filed Mar. 14, 1994, which is a continuation of Ser. No. 07/688,275, filed Apr. 22, 1991, both now abandoned.

BACKGROUND OF THE INVENTION

1. Field of the Invention

The present invention relates to a video signal processing apparatus for conducting a series of signal processings in accordance with a synchronizing signal.

2. Description of the Related Art

In a case where a series of signal processings are conducted on a video signal by the passage of the video signal through series-connected signal processing blocks, the same synchronizing signal is generally supplied from a single circuit, for example, a synchronizing signal separation circuit, to the individual signal processing blocks as a reference signal, so that the time delay required in each signal processing block is imposed on the synchronizing signal within each block.

FIG. 1 is a block diagram of a conventional video tape recorder for recording and reproducing a high-definition TV signal. A luminance signal Y and color differential signals Pb and Pr, respectively supplied to input terminals 10, 12 and 14, are respectively converted into digital signals by A/D converters 16, 18 and 20. The resultant luminance signal Y is directly sent to a frame memory 22 whereas the color differential signals Pb and Pr are converted into a line sequential signal by a color-differential signal sequential circuit 24 and then supplied to and stored in the frame memory 22. The luminance signal Y and the color differential signals Pb and Pr stored in the frame memory 22 are read out from the frame memory 22 in the form of a two-channel time-division multiplexed signal (TCI=Time Compressed Integration). This time-division multiplexed signal is converted into analog signals by D/A converters 26 and 28. Modulators 30 and 32 respectively conduct processings required to produce signals having a signal form adequate for magnetic recording, such as frequency modulation or low frequency band conversion. The resultant signals are supplied to a magnetic head on a rotation drum 34 respectively through recording amplifiers 31 and 33 and then recorded on a magnetic tape wound around the rotation drum 34.

For reproduction, the output of the magnetic head on the rotation drum 34 is supplied through reproduction amplifiers 35 and 37 to equalizing circuits 36 and 38 which conduct equalization of the waveform. The resultant reproduced signals are FM demodulated by demodulators 40 and 42, converted into digital signals by A/D converters 44 and 46 and then temporarily stored in the frame memory 48. The luminance signal read out from the frame memory 48 is converted into an analog signal by a D/A converter 50. The color-differential line sequential signal read out from the frame memory 48 is converted into simultaneous signals by a color-differential signal simultaneous circuit 52, and then converted into analog signals by D/A converters 54 and 56. Consequently, the reproduced luminance signal is output from an output terminal 58 while the reproduced color differential signals Pb and Pr are respectively output from output terminals 60 and 62.

Next, a synchronizing signal system will be described. A switch 66 supplies either an external synchronizing signal input to an input terminal 64 or a luminance signal containing a composite synchronizing signal which is input to an input terminal 10 to a synchronizing signal separation circuit 68 which separates a horizontal synchronizing signal and a vertical synchronizing signal. The separated horizontal and vertical synchronizing signals are applied to a timing control circuit 70 for the color-differential signal sequential circuit 24 and to a timing control circuit 72 for the frame memory 22 to time the operation of the color-differential signal sequential circuit and writing of data in the frame memory 22.

With regard to the reading-out system of the frame memory 22, a drum rotating signal which is in synchronism with the rotation of the drum 34 is applied from a drum rotation control circuit 35 of the rotation drum 34 to a timing control circuit 72, and to a timing control circuit 74 for the D/A converters 26 and 28, by which the data stored in the frame memory 22 is read out and then converted into digital signals synchronously with rotation of the rotation drum 34.

For reproduction, the above-described drum rotating signal is applied to a timing control circuit 76 for timing the D/A converters 44 and 46 and to a timing control circuit 78 for timing the frame memory 48. Consequently, a reproduced signal is converted into a digital signal and then written in the frame memory 48 synchronously with rotation of the rotation drum 34.

A synchronizing signal generation circuit 80 generates horizontal and vertical synchronizing signals in accordance with a standard clock signal. The generated horizontal and vertical synchronizing signals are supplied to the timing control circuit 78 and to a timing control circuit 82 for timing the color-differential signal simultaneous circuit 52 to time reading-out of data from the frame memory 48 and the operation of the color-differential signal simultaneous circuit 52. The synchronizing signal generated by the synchronizing signal generation circuit 80 is also supplied to a synchronizing signal output terminal 84.

The individual timing control circuits each introduce on the synchronizing signal input thereto a time delay required by the corresponding signal processing circuit and supplies the resultant signal to that signal processing circuit. For example, the timing control circuit 72 generates a timing signal whose passage is delayed by a time corresponding to the time delay generated in the A/D converter 16 in both horizontal and vertical directions during recording to the time of writing of the luminance signal Y in the frame memory 22. Also, the timing control circuit 72 generates a timing signal whose passage is delayed by a time corresponding to the signal delay generated in the A/D converters 18 and 20 and in the color-differential signal sequential circuit 24 in both vertical and horizontal directions to the time of writing of the color-differential signal Pb/Pr in the frame memory 22.

In the above-described configuration, in a case where a local circuit modification occurs in a certain circuit block, a change in the amount of signal delay caused by that modification spreads to the subsequent circuits, and the operation timing of all the circuit blocks in the same synchronization system must thus be modified.

SUMMARY OF THE INVENTION

A primary object of the present invention is to provide a video signal processing apparatus which is capable of overcoming the aforementioned problem of the conventional technique.

Another object of the present invention is to provide a video signal processing apparatus which is capable of readily coping with a design change or expansion or elimination of the function which takes place locally in a series of signal processing blocks.

In order to achieve the above objects, the present invention provides a video signal processing apparatus which comprises (a) first signal processing means for processing a video signal, (b) second signal processing means for processing the video signal output from the first signal processing means, (c) reference signal generation means for generating a reference signal, (d) first timing control means for timing the operation of the first signal processing means on the basis of the reference signal, the first timing control means delaying the passage of the reference signal by a time interval corresponding to a delay time of the video signal generated by the first signal processing means and for outputting the delayed signal, and (e) second timing control means for timing the operation of the second signal processing means using the delayed reference signal output from the first timing control means.

According to a further aspect of the present invention, a video signal processing apparatus includes (a) signal processing means for processing a video signal, the signal processing means including a plurality of series-connected signal processing circuits; (b) reference signal generation means for generating a reference signal; and (c) timing control means including a plurality of timing control circuits for respectively controlling the plurality of signal processing circuits in accordance with the reference signal. At least one of the plurality of timing control circuits receives a timing signal conforming to the reference signal, and delays the passage of the timing signal therethrough by a time interval corresponding to a delay time of the video signal generated by the corresponding signal processing circuit and outputs a delayed timing signal.

According to yet a further aspect of the present invention, a video signal memorizing apparatus comprises (a) signal processing means for processing a video signal; (b) a memory for storing the video signal output from the signal processing means; (c) synchronizing signal separation means for separating a synchronizing signal from the video signal which is supplied to the signal processing means; (d) timing control means for timing the operation of the signal processing means on the basis of the separated synchronizing signal, the timing control means delaying the passage of the synchronizing signal therethrough by a time interval corresponding to a delay time of the video signal generated by the signal processing means and outputting a delayed synchronizing signal; and (e) write control means for timing writing of the video signal in the memory using the delayed synchronizing signal output from the timing control means.

According to another aspect of the present invention, a video signal recording apparatus includes (a) first signal processing means for processing a video signal; (b) second signal processing means for processing the video signal output from the first signal processing means; (c) recording means for recording the video signal output from the second signal processing means on a recording medium; (d) reference signal generation means for generating a reference signal for timing the operation of the recording means; (e) first timing control means for timing the operation of the first signal processing means on the basis of the reference signal, the first timing control means delaying the reference signal by a time interval corresponding to a delay time of the video signal generated by the first signal processing means and outputting a delayed reference signal; and (f) second timing control means for timing the operation of the second signal processing means using the delayed reference signal output from the first timing control means.

According to a yet another aspect of the present invention, a video signal reproducing apparatus comprises (a) reproduction means for reproducing a video signal from a recording medium; (b) reference signal generation means for generating a reference signal for timing the operation of the reproduction means; (c) first signal processing means for processing the video signal output from the reproduction means; (d) second signal processing means for processing the video signal output from the first signal processing means; (e) first timing control means for timing the operation of the first signal processing means on the basis of the reference signal, the first timing control means delaying the reference signal by a time interval corresponding to a delay time of the video signal generated by the first signal processing means and outputting a delayed reference signal; and (f) second timing control means for timing the operation of the second signal processing means using the delayed reference signal output from the first timing control means.

According to a further aspect of the present invention, a video signal reading apparatus comprises (a) a memory for storing a video signal; (b) signal processing means for processing the video signal read out from the memory; (c) reference signal generation means including an oscillator for generating a predetermined clock signal; (d) read-out control means for timing read-out of the video signal from the memory on the basis of the reference signal, the read-out control means delaying the reference signal by a time interval required to read out the video signal from the memory and outputting a delayed reference signal; and (e) timing control means for timing the operation of the signal processing means using the delayed reference signal output from the read-out control means.

Other objects and advantages of the invention will become apparent from the following description of preferred embodiments taken in connection with the accompanying drawings.

BRIEF DESCRIPTION OF THE DRAWINGS

FIG. 2, comprising FIGS. 2A and 2B, is a block diagram of an embodiment of a VTR according to the present invention.

DETAILED DESCRIPTION OF THE PREFERRED EMBODIMENT

An embodiment of the present invention will now be described with reference to FIG. 2.

Figure 1A:
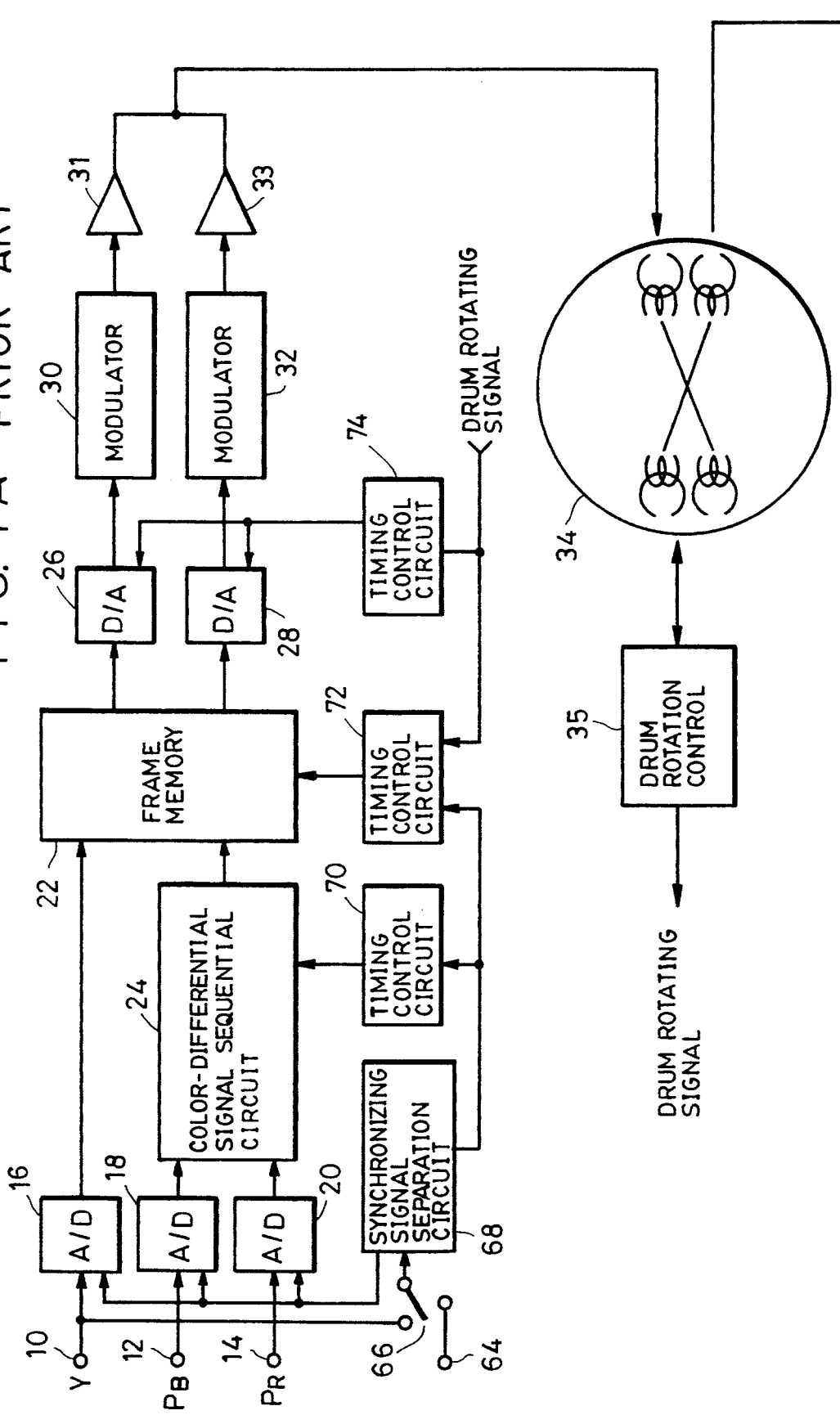
FIGS. 1A and 1B, is a block diagram of a conventional VTR.
Figures 1, 1B:
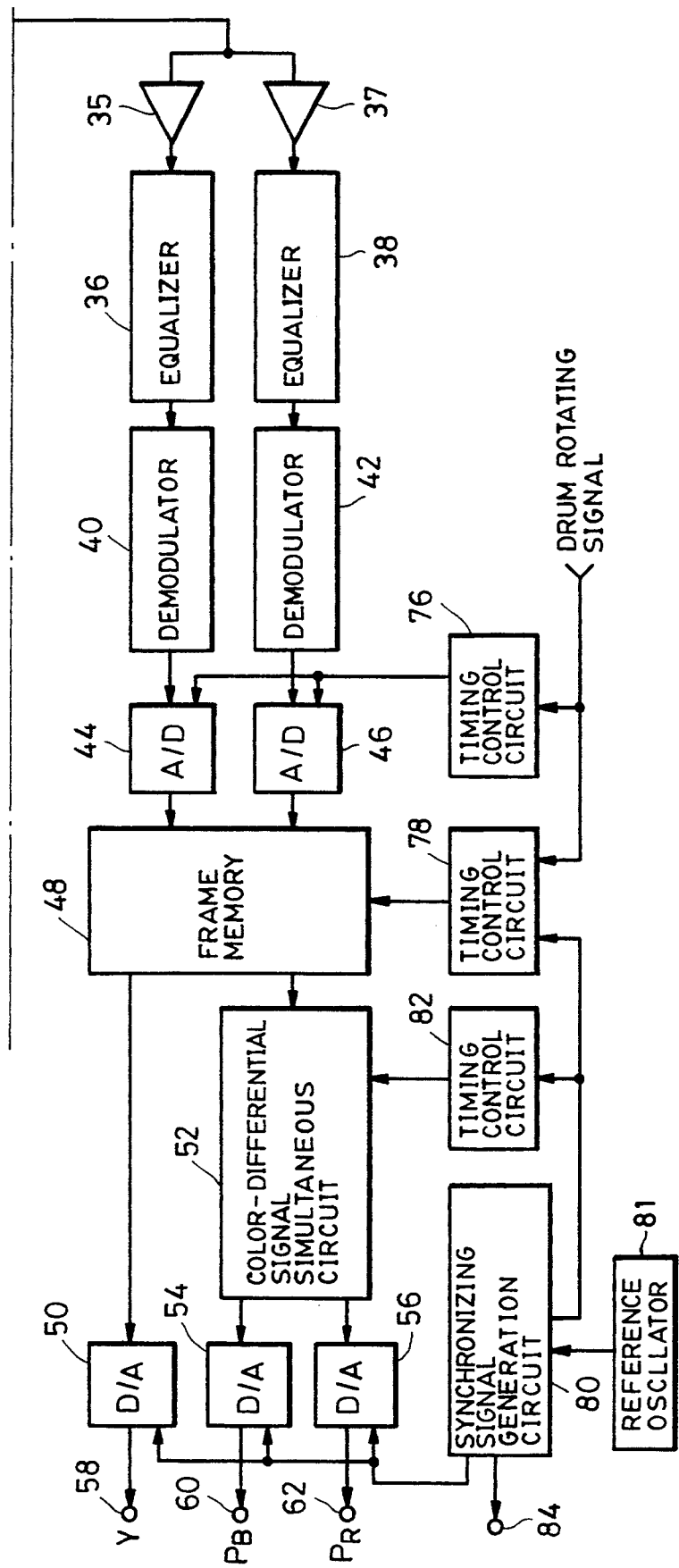
FIG. 1, comprising
Figure 2A:
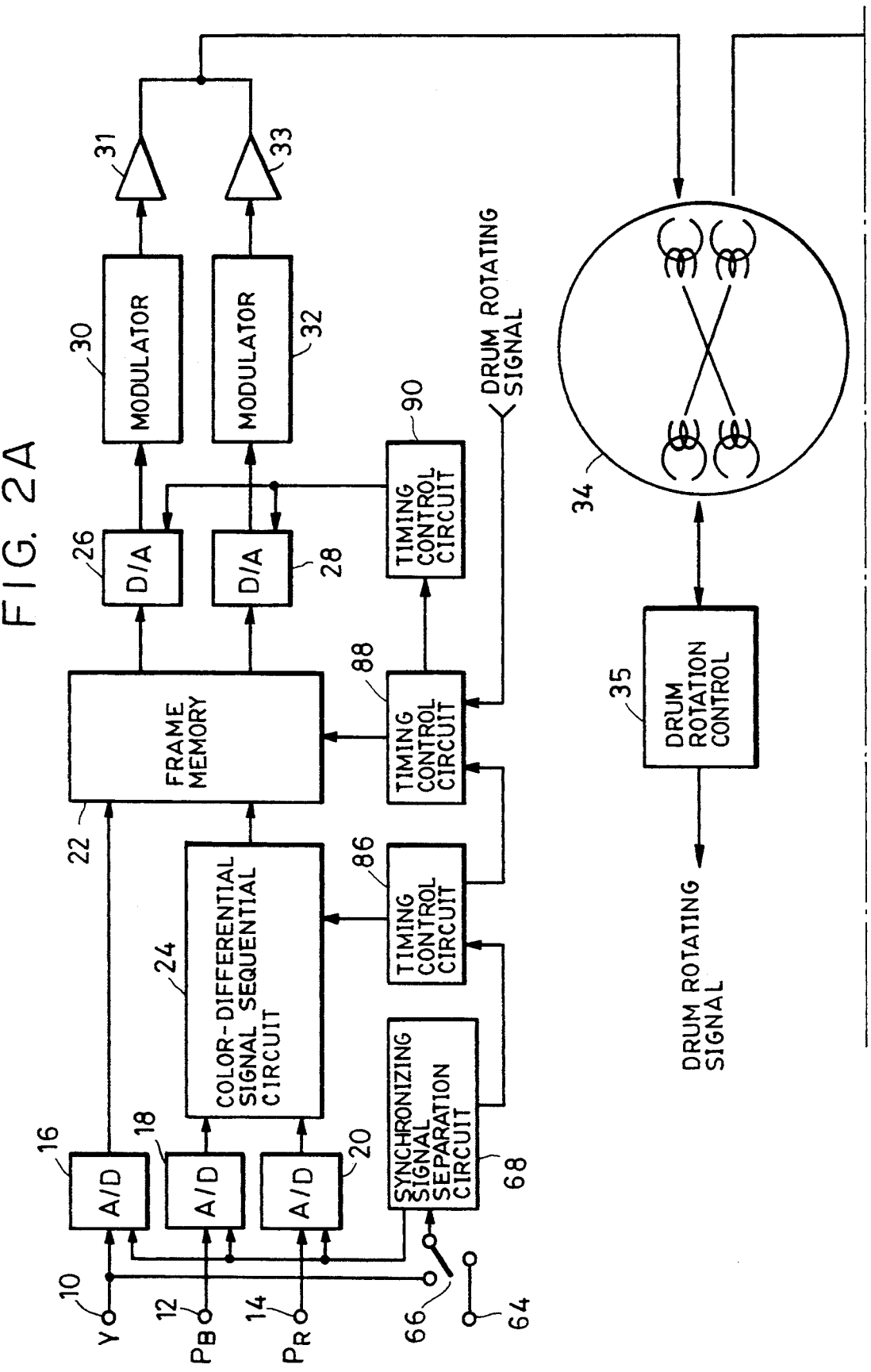

FIG. 2, comprising FIGS. 2A and 2B, is a block diagram of a VTR for recording and reproducing a high-definition TV signal to which the present invention may be applied. In FIG. 2, the same reference numerals are used to denote components which are the same as those shown in FIG. 1. Since the system for processing the luminance signal Y and the color-differential signals Pb and Pr is the same as that shown in FIG. 1, the synchronizing system will chiefly be described below.

The synchronizing signal separation circuit 68 separates horizontal and vertical synchronizing signals from either the luminance signal input to the input terminal 10 or the external synchronizing signal input to the input terminal 64, and supplies the separated synchronizing signals to the timing control circuit 86 alone for timing the color-differential signal sequential circuit 24. The timing control circuit 86 supplies to the color-differential signal sequential circuit 24 a timing signal whose passage has been delayed by a time corresponding to the time delay generated by the A/D converters 18 and 20 and supplies to the timing control circuit 88 for the frame memory 22 a synchronizing signal produced by delaying the passage of the synchronizing signal supplied from the synchronizing signal separation circuit 68 by a time corresponding to the time delay generated by the color-differential signal sequential circuit 24.

With regard to the reading out of data from the frame memory 22, the drum rotating signal from the drum rotation control circuit 35 is supplied to the timing control circuit 88 alone. The timing control circuit 88 controls reading-out of data from the frame memory 22 in accordance with the drum rotating signal and applies to the timing control circuit 90 for the D/A converters 26 and 28 a timing signal produced by delaying passage of the drum rotating signal by a time corresponding to the time required to read out data from the frame memory 22. The drum rotation control circuit 35 detects the rotation phase of the drum 34, i.e., the rotation phase of the rotation head, and thereby outputs the drum rotation signal.

For reproduction, the synchronizing system is basically the same as that for recording. That is, the drum rotating signal is supplied only to the timing control circuit 92 for timing the A/D converters 44 and 46. The timing control circuit 92 supplies a timing signal to the A/D converters 44 and 46 and supplies to the timing control circuit 94 for the frame memory 48 a reference signal produced by delaying passage of the drum rotating signal by a time corresponding to the time delay generated by the A/D converters 44 and 46. The timing control circuit 94 controls writing of data in the frame memory 48 in accordance with that reference signal.

The synchronizing signal generating circuit 80 has a reference oscillator 81 for generating a reference clock to be supplied to the synchronizing signal generating circuit 80, and generates a synchronizing signal in accordance with a clock output from the reference oscillator. The generated synchronizing signal is supplied only to the timing control circuit 94. The timing control circuit 94 controls reading-out of data from the frame memory 48 in accordance with the synchronizing signal and supplies to the timing control circuit 96 for timing the color-differential signal simultaneous circuit 52 a timing signal produced by delaying passage of the synchronizing signal from the synchronizing signal generation circuit 80 by a time corresponding to the time delay generated by the frame memory 48.

The individual timing control circuits are designed to introduce separate time delays on the horizontal and vertical synchronizing signals for the luminance signal and on the horizontal and vertical synchronizing signals for the color-differential signals by the separate delay circuits.

As will be understood from the foregoing description, in the present invention, when a change in the amount of signal delay occurs locally in a plurality of series-connected signal processing blocks due to the design change or expansion or elimination of the function, the amount of delay of only the corresponding delay means is changed. This allows the operation timing of the individual signal processing blocks to be designed separately. Such a circuit configuration can flexibly cope with design change or function change.

The individual components shown in outline or designated by blocks in the Drawings are all well-known in the image processing arts, and their specific construction and operation are not critical to the operation or best mode for carrying out the invention. While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A video signal processing apparatus, comprising:
    (a) first signal processing means for processing a video signal;
    (b) second signal processing means for processing the video signal output from said first signal processing means;
    (c) reference signal generation means for generating a reference signal;
    (d) first timing control means for timing the operation of said first signal processing means on the basis of the reference signal, said first timing control means delaying the passage therethrough of the reference signal by a time period corresponding to a delay time of the video signal processed by said first signal processing means, and for outputting a delayed reference signal; and
    (e) second timing control means for timing the operation of said second signal processing means using the delayed reference signal output from said first timing control means, wherein a corresponding change in the delayed reference signal occurs when said first timing control means is altered or replaced so that the changed delayed reference signal corresponds to a change in the delay time of the video signal processed by the altered or replaced first signal processing means.

2. The apparatus according to claim 1, wherein said reference signal generation means includes a synchronizing signal separation circuit for separating a synchronizing signal from the video signal which is supplied to said first signal processing means.

3. The apparatus according to claim 1, further comprising a reproducing head, and wherein the video signal input to said first signal processing means is a signal reproduced from a recording medium by said reproducing head, said reference signal generation means including relative position detection means for generating a relative position signal representative of a relative positional relationship between the recording medium and said reproducing head.

4. The apparatus according to claim 3, wherein said reproducing head includes a rotation head for tracing the recording medium, said relative position detection means including rotational phase detection means for detecting a rotational phase of said rotation head.

5. The apparatus according to claim 1, further comprising a recording head for recording the video signal output from said second signal processing means on a recording medium, and wherein said reference signal generation means includes relative position detection means for generating a relative position signal representative of a relative positional relationship between the recording medium and said recording head.

6. The apparatus according to claim 5, wherein said recording head includes a rotation head for tracing the recording medium, said relative position detection means including rotational phase detection means for detecting a rotational phase of said rotation head.

7. The apparatus according to claim 5, wherein said first signal processing means includes a memory for storing the video signal, said first timing control means timing read-out of the video signal from said memory in accordance with the reference signal.

8. The apparatus according to claim 1, wherein said reference signal generation means includes a reference oscillator for generating a predetermined clock signal, and generates the reference signal on the basis of the clock signal.

9. The apparatus according to claim 8, wherein said first signal processing means includes a memory for storing the video signal, said first timing control means timing read-out of the video signal from said memory in accordance with the reference signal.

10. The apparatus according to claim 1, wherein the video signal input to said first signal processing means includes two types of color differential signals, said first signal processing means including a sequential circuit for converting said two types of color differential signals into a line sequential signal.

11. A video signal processing apparatus, comprising:
(a) signal processing means for processing a video signal, said signal processing means including a plurality of series-connected signal processing circuits;
(b) reference signal generation means for generating a reference signal; and
(c) timing control means including a plurality of timing control circuits for respectively controlling the plurality of signal processing circuits in accordance with the reference signal;
wherein at least one of the plurality of timing control circuits receives a timing signal conforming to the reference signal, and delays the passage of the timing signal therethrough by a time period corresponding to a delay time of the video signal processed by the corresponding signal processing circuit and outputs a delayed timing signal, and
wherein another of the plurality of timing control circuits controls the corresponding signal processing circuit in accordance with the delayed timing signal, and
wherein a corresponding change in the delayed timing signal occurs when the timing control circuit that outputs the delayed timing signal is altered or replaced so that the changed delayed timing signal corresponds to a change in the delay time of the video signal processed by the altered or replaced corresponding signal processing circuit.

12. A video signal memorizing apparatus, comprising:
(a) signal processing means for processing a video signal;
(b) a memory for storing the video signal output from said signal processing means;
(c) synchronizing signal separation means for separating a synchronizing signal from the video signal which is supplied to said signal processing means;
(d) timing control means for timing the operation of said signal processing means on the basis of the separated synchronizing signal, said timing control means delaying the passage of the synchronizing signal therethrough by a time period corresponding to a delay time of the video signal processed by said signal processing means and outputting a delayed synchronizing signal; and
(e) write control means for timing writing of the video signal in said memory using the delayed synchronizing signal output from said timing control means, wherein a corresponding change in the delayed synchronizing signal occurs when said timing control means is altered or replaced so that the changed delayed synchronizing signal corresponds to a change in the delay time of the video signal processed by the altered or replaced signal processing means.

13. A video signal recording apparatus, comprising:
(a) first signal processing means for processing a video signal;
(b) second signal processing means for processing the video signal output from said first signal processing means;
(c) recording means for recording the video signal output from said second signal processing means on a recording medium;
(d) reference signal generation means for generating a reference signal for timing the operation of said recording means;
(e) first timing control means for timing the operation of said first signal processing means on the basis of the reference signal, said first timing control means delaying the reference signal by a time period corresponding to a delay time of the video signal processed by said first signal processing means and outputting a delayed reference signal; and
(f) second timing control means for timing the operation of said second signal processing means using the delayed reference signal output from said first timing control means, wherein a corresponding change in the delayed reference signal occurs when said first timing control means is altered or replaced so that the changed delayed reference signal corresponds to a change in the delay time of the video signal processed by the altered or replaced first signal processing means.

14. The apparatus according to claim 13, wherein said first signal processing means includes a memory, said first timing control means including read-out control means for timing read-out of the video signal from said memory.

15. A video signal reproducing apparatus, comprising:
(a) reproduction means for reproducing a video signal from a recording medium;

(b) reference signal generation means for generating a reference signal for timing the operation of said reproduction means;

(c) first signal processing means for processing the video signal output from said reproduction means;

(d) second signal processing means for processing the video signal output from said first signal processing means;

(e) first timing control means for timing the operation of said first signal processing means on the basis of the reference signal, said first timing control means delaying the reference signal by a time period corresponding to a delay time of the video signal processed by said first signal processing means and outputting a delayed reference signal; and (f) second timing control means for timing the operation of said second signal processing means using the delayed reference signal output from said first timing control means, wherein a corresponding change in the delayed reference signal occurs when said first timing control means is altered or replaced so that the changed delayed reference signal corresponds to a change in the delay time of the video signal processed by the altered or replaced first signal processing means.

16. The apparatus according to claim 15, wherein said second signal processing means includes a memory, said second timing control means including write control means for timing writing of the video signal in said memory.

17. A video signal reading apparatus, comprising:

(a) a memory for storing a video signal;

(b) signal processing means for processing the video signal read out from said memory;

(c) reference signal generation means including an oscillator for generating a predetermined clock signal;

(d) read-out control means for timing read-out of the video signal from said memory on the basis of the reference signal, said read-out control means delaying the reference signal by a time interval required to read out the video signal from said memory and outputting a delayed reference signal; and (e) timing control means for timing the operation of said signal processing means using the delayed reference signal output from said read-out control means, wherein a corresponding change in the delayed reference signal occurs when said read-out control means is altered or replaced so that the changed delayed reference signal corresponds to a change in the delay time required to read out the video signal from the altered or replaced memory.

18. A signal process apparatus comprising:

(a) forward signal processing means for processing a signal;

(b) backward signal processing means for processing the signal output from said forward signal processing means;

(c) reference signal generation means for generating a reference signal;

(d) forward timing control means for timing an operation of said forward signal processing means on the basis of the generated reference signal, said forward timing control means delaying the reference signal by a time period corresponding to a delay time of the forward signal processing means, and for outputting a delayed reference signal; and (e) backward timing control means for timing the operation of said backward signal processing means on the basis of the delayed reference signal;

wherein a corresponding change in the delayed reference signal occurs when said forward signal processing means is altered or replaced.

19. Apparatus according to claim 18, wherein the process signal comprises a video signal.

20. Apparatus according to claim 18, wherein said reference signal generation means comprises reference signal generating means for generating a predetermined clock signal, said reference signal generation means generating said reference signal on the basis of the predetermined clock signal.

21. Apparatus according to claim 18, wherein said forward signal processing means comprises a memory.

22. A signal processing comprising:

(a) a plurality of signal processing means coupled in series;

(b) reference signal generation means for generating a reference signal; and (c) a plurality of timing control means coupled in series, said plurality of timing control means including a forward timing control means for outputting a delayed reference signal which comprises said reference signal delayed by a predetermined period of time, said plurality of timing control means, other than said forward timing control means, respectively timing-controlling each of said plurality corresponding of signal processing means on the basis of said delayed reference signal;

wherein said predetermined period of time is set in accordance with a processing time of the timing-controlled signal processing means, and wherein said delayed reference signal is supplied from said forward timing control means.

23. Apparatus according to claim 22, wherein said reference signal generation means comprises a reference signal generating means for generating a predetermined clock signal, said reference signal generation means generating the reference signal on the basis of the predetermined clock signal.

24. Apparatus according to claim 22, wherein said forward signal processing means comprises a memory.

* * * * *

UNITED STATES PATENT AND TRADEMARK OFFICE
CERTIFICATE OF CORRECTION

PATENT NO. : 5,400,148  Page 1 of 3
DATED : March 21, 1995
INVENTOR(S) : KASHIDA, ET AL.

It is certified that error appears in the above-indentified patent and that said Letters Patent is hereby corrected as shown below:

ON THE TITLE PAGE:

At [54] Title

"SERIES CONNECTED" should read --SERIES-CONNECTED--.

SHEET 2

Fig. 1B, "OSCLLATOR" should read --OSCILLATOR--.

SHEET 4

Fig. 2B, "OSCLLATOR" should read --OSCILLATOR--.

COLUMN 1

Line 2, "SERIES CONNECTED" should read --SERIES-CONNECTED--.

COLUMN 1

Line 29, "Pb and Pr," should read --$P_B$ and $P_R$,--.

COLUMN 1

Line 34, "Pb and Pr" should read --$P_B$ and $P_R$--.

COLUMN 1

Line 38, "Pb and Pr" should read --$P_B$ and $P_R$--.

COLUMN 1

Line 67, "Pb and Pr" should read --$P_B$ and $P_R$--.

UNITED STATES PATENT AND TRADEMARK OFFICE
CERTIFICATE OF CORRECTION

PATENT NO. : 5,400,148

DATED : March 21, 1995

INVENTOR(S) : KASHIDA, ET AL.

It is certified that error appears in the above-indentified patent and that said Letters Patent is hereby corrected as shown below:

COLUMN 2

Line 60, "Pb/Pr" should read --$P_B/P_R$--.

COLUMN 5

Line 5, "Pb and Pr" should read --$P_B$ and $P_R$--.

COLUMN 5

Line 33, "28" should read --28,--.

COLUMN 6

Line 16, "well-known" should read --well known--.

COLUMN 9

Line 42, "interval" should read --period--.

UNITED STATES PATENT AND TRADEMARK OFFICE
CERTIFICATE OF CORRECTION

PATENT NO. : 5,400,148

DATED : March 21, 1995

INVENTOR(S) : KASHIDA, ET AL.

It is certified that error appears in the above-indentified patent and that said Letters Patent is hereby corrected as shown below:

COLUMN 10

Line 42, "corresponding of" should read --of corresponding--.

COLUMN 10

Line 43, "said delayed" should read --said reference signal or said delayed--

Signed and Sealed this

Fifteenth Day of August, 1995

Attest:

BRUCE LEHMAN

Attesting Officer        Commissioner of Patents and Trademarks